United States Patent Office 3,717,472
Patented Feb. 20, 1973

3,717,472
SEPARATING AROMA- AND FLAVOR-BEARING SUBSTRATES INTO AROMA AND FLAVOR CONCENTRATES
Rudolf G. K. Strobel, Colerain Township, Hamilton County, Ohio, assignor to The Procter & Gamble Company, Cincinnati, Ohio
No Drawing. Filed June 30, 1971, Ser. No. 158,590
Int. Cl. A23f 1/04
U.S. Cl. 99—65
26 Claims

ABSTRACT OF THE DISCLOSURE

Aroma- and flavor-bearing substrates are separated into an aroma concentrate and a flavor concentrate by pulsing or applying in a continuous fashion wet steam to a zone containing the substrate. The substrate-containing zone is held under vacuum pressure and the flavor concentrate is collected in a first trap, while an aroma concentrate is collected in a second trap. In a preferred embodiment, the substrate comprises either coffee or tea.

BACKGROUND OF THE INVENTION

Many food products and especially those from which extracts are made to produce beverages, are known to contain a delicate balance of both flavor- and aroma-bearing essences. This delicate balance of flavor- and aroma-bearing essences, naturally present in some food products typically gives a sensory impression of a very pleasing balance of flavor and aroma at first. However, it is very common for these types of foods to rapidly develop a rancid aroma after being subjected to atmospheric conditions for a short period of time. This rapidly developing rancidity in the aroma essences often significantly impairs the beverage flavor of any beverage isolated and produced from extracts of the food product. Moreover, the compounds contributing aroma rancidity often act as catalytic agents for the rapid development of ranicidity in the beverage flavor components. Therefore, while certain of the highly volatile aroma-bearing essences are extremely desirable from the standpoint of presenting a pleasing initial sensory impact, they are undesirable in the long run from the standpoint of contributing to rapid development of aroma as well as flavor rancidity.

Certain of these well known food products such as coffee, tea, and some well known fruits such as oranges, grapes, strawberries, cherries, and the like, are often processed by extraction methods to obtain concentrated extracts which can either be dried or diluted to prepare beverages. Typically, during processing to obtain extracts, the previously referred to delicate balance of aroma-bearing essences and flavor-bearing essences is upset by subjection to heat and pressure conditions necessary for an efficient extraction process. Thus, the ultimate beverage extract or dried material contains a quite different balance of flavor- and aroma-bearing essences than did the initial food product. For many years, those skilled in the art have approached this problem by attempting to remove the aroma-bearing essences from the natural food product prior to extraction, and thereafter add the aroma-bearing essences back after the extraction procedure. In other words, the aroma essences are removed, the remaining portion is subjected to the necessary temperature and pressure conditions suitable for high extraction yields, and subsequently the aroma-bearing essences are added back. While this process has met with a large degree of success, especially in regard to coffee and tea production, it has certain inherent disadvantages. First, the aroma-bearing essences after adding back to the resulting extract are themselves often subjected to conditions during drying which bring about a substantial impairment in the flavors and aromas they produce. Secondly, the extract remaining after removal of aroma-bearing essences contains a number of natural flavor-bearing essences which are significantly impaired and changed to create unnatural flavors during the high pressure and high temperature conditions needed for the most efficient extraction.

It has now been discovered that the natural balance of aroma and flavor essences can be retained in resulting extracts by utilizing the process of this invention. In particular, the flavor-bearing essences can be separated from the aroma-bearing essences such that the resulting liquid concentrate which comprises substantially only the flavor-bearing essences is not subjected to rapid rancidity caused by incorporation of highly volatile aroma essences therein.

An object of this invention is to separate aroma- and flavor-bearing essences from food substrates which typically contain aroma- and flavor-bearing essences such that the most volatile aroma essences do not contribute to the rapid development of rancidity in beverages produced from the food product.

It is another object of this invention to form a liquid flavor concentrate which is substantially free from highly volatile aroma-bearing essences which could, if present, rapidly develop rancidity in the resulting concentrate.

It is yet another object of this invention to provide a condensed aroma-bearing essence which, if desired, can be added back to liquid extracts or dried products resulting therefrom to provide a pleasing aroma enhancement.

These and other objects will become apparent from the following description of the invention.

SUMMARY OF THE INVENTION

This invention involves a method of separating aroma- and flavor-bearing food substrates into a liquid flavor concentrate and an aroma concentrate. The liquid flavor concentrate is especially suitable for dilution to form beverages. The aroma concentrate can be added back to dried extract to provide aroma enhancement.

The process involves passing wet steam either in a pulsing manner or in a slow continuous fashion through a zone containing the food substrate while the zone is held under vacuum conditions. A first trap held in communication with the food substrate-containing zone is at intermediate low range temperatures and the liquid flavor concentrate is collected therein. A second trap is held at extremely low range temperatures in the order of liquid nitrogen ($-195.8°$ C.) and in this trap an aroma-bearing concentrate is condensed.

The process is especially suitable for providing a coffee flavor concentrate which is substantially free from highly volatile aroma-bearing compounds which rapidly develop rancidity after subjection to ambient conditions of light and heat and therefore cause unnatural beverage flavors and aromas.

DETAILED DESCRIPTION OF THE INVENTION

The process of this invention is unique, not only from the standpoint of the result obtained, i.e. a substantial separation of a liquid concentrate fraction containing only desirable flavors and essentially no volatile aromas which will rapidly develop rancidity, while simultaneously obtaining an aroma concentrate, but also from the standpoint of the physical chemistry involved in the process. In reality the process is a hybrid process which combines the principles of steam distillation, the principles of desorption, the principles of conventional extraction, the principles of diffusion, and the principles of dissolution as well as readsorption (chromatography). In this regard, the process is uniquely different and distinguishable from prior art processes which have been applied to the production of coffee in which an aroma-bearing frost is condensed and subsequently added back to either instant coffee extract which is subsequently concentrated and dried, or added back directly to dried extract. For examples of this type of operation, see Lemonnier, U.S. Pat. 2,680,687, which discloses dry distillation of coffee and trapping of aroma essences at −180° C.; Kline, U.S. Pat. 3,406,074, which shows stripping and condensing of aroma essence fractions from roast and ground coffee utilizing vacuum conditions and temperatures not in excess of 105° F.; and Mook, U.S. Pat. 3,035,922, which discloses vacuum stripping of moist coffee grounds at temperatures within the range of 25° to 50° C. to provide an aroma frost condensed at temperatures of from 0° C. to −80° C. These prior art methods which are applied specifically to coffee can be easily distinguished from the process of this invention in that none of these patents disclose substantial separation of aroma essences from flavor essences to give simultaneously a liquid flavor concentrate and an aroma concentrate; moreover, as will be evident from the following description of the invention, the prior art utilize significantly different processing conditions.

For convenience and clarity as well as succinctness, the following description of the invention is given in the context of utilizing roast and ground coffee as the food substrate; however, as heretofore explained and as will be especially evident from an examination of the examples, this process has a wider utility than use for coffee only, and can be applied to many food substrates including those previously mentioned, as well as vegetables such as potatoes and many others.

Roast and ground coffee is charged into the substrate-containing zone which, if desired, can be an extraction column. The substrate-containing zone, i.e., the roast and ground coffee column, is placed in communication with at least two in-line condensing traps. The first trap is held at temperatures in the range of from −20° C. to −76° C. by a convenient cooling medium such as Dry Ice. The second trap is cooled by liquid nitrogen to a temperature in the order of −195.8° C. The entire system is held under vacuum by a vacuum pump. Preferably, prior to the commencement of the process of this invention, the system is purged of oxygen by flooding the entire system with an inert gas. This flushing of the system with an inert gas prior to commencement of the process of the invention is preferred in order to remove oxygen from the system because oxygen within the system contributes to the rapid development of impaired flavor and aroma.

While not critical to the process but preferred from the standpoint of development of the best flavor and aroma concentrates, the food substrate can, prior to treatment by the process of this invention, be subjected to liquid nitrogen freezing. Such preparation of the food substrate prior to any size reduction minimizes formation of free radicals which can deteriorate subsequently separated aroma and flavor concentrates. Free radical formation in the absence of substrate freezing may occur during typical mechanical stress actions such as grinding, flaking, and other size reduction techniques.

According to the process of this invention wet steam is passed either in a pulsing fashion or a slow continuous fashion through the roast and ground coffee. It is important to note that the wet steam must be passed in a slowly, i.e. pulsed or slow continuous addition, through the roast and ground coffee-containing zone; for, in the event that the wet steam is allowed to rapidly flood the entire roast and ground coffee-containing zone the flavor constituents and the aroma constituents are not adequately separated. In addition, where rapid wet steam introduction has been attempted it has been found that no liquid flavor concentrate of satisfactory flavor is obtained. While not critical, it is preferred in order to carry color-forming bodies and color precursors through the system that the process be carried out in a downward fashion. However, as hereinafter explained, upward introduction of wet steam may also be employed.

According to the process, the roast and ground coffee is subjected to wet steam in a pulsing or slow continuous fashion. Both the use of wet steam and the slow introduction by either pulsing or continuous methods are critical to the process of this invention. For, in the event that the entire column becomes flooded with water, no satisfactory separation into a liquid flavor concentrate and an aroma-bearing concentrate will occur. Moreover, if the column becomes entirely wetted during the initial stages of the process, the process merely becomes a cold extraction process with the result being a conventional extract liquor as opposed to a liquid flavor concentrate which has unique stability because most of the highly volatile aroma-bearing constituents having a great propensity for staling are removed therefrom.

In actual practice wet steam per se is not directly introduced into the column, but rather hot water is employed. However, because of the vacuum conditions employed within the column, the water rapidly evaporates to provide cold steam. Since the food substrate zone is usually cooled by a cooling jacket, some of the steam rapidly condenses on the food substrate. It is in the context of this description that the term "wet steam" is used herein.

Turning first to a description of the manner in which the preferred method of pulsing downward with wet steam is accomplished, hot water near 100° C. in introduced into the top of the roast and ground coffee-containing zone. For reasons previously explained, the water rapidly evaporates to provide cold wet steam. The first pulse should comprise only a sufficient amount of steam to wet a first small portion of the column. Generally, this will comprise a first one-tenth to one-eighth of the column. When the first steam pulse is introduced it rapidly comes into contact with the roast and ground coffee which is usually at lower temperatures than the steam. Immediately upon contact with the steam the most highly volatile aroma materials are desorbed from the substrate and by operation of gravity, the influence of the vacuum, and as hereafter explained in more detail, the continual sparging in a downward manner by an inert gas where such is employed, are carried downward through the column. It is these most highly volatile aroma-bearing materials which most often contribute to the rapid rancidity of flavor and aroma concentrates and thus it is desirable that they be removed immediately.

Once the first pulse of steam hits the food substrate and the most highly volatile materials are desorbed as previously described, the steam condenses onto the surface of the coffee particles and begins to soak into the particles. This in turn causes more gas desorption and likewise these aroma-bearing essences are driven down further into the column. Finally, the water saturates the outermost portions of the particle and, because of the vacuum conditions water begins to evaporate from the outside of the particle and form cold steam. In this manner the water-soluble flavor constituents are transported to the outer particle surface from where they can be stripped away with the next pulse of wet steam.

After subjection to the first pulse of wet steam there will be a readily visible interface between the dry coffee particles which have not been subjected to cold wet steam and those particles which have been subjected to cold wet steam. This interface will comprise in appearance a dark color band because of the presence of color-bearing bodies. With each succeeding pulse, the band gradually moves downward through the column and the entire process of cold steam desorption of highly volatile materials, water soaking and further desorption of slightly less volatile materials, water evaporation towards the surface of the particles, and cold steam stripping to carry flavor concentrates further down the column will again be repeated.

Subjection to pulsed cold wet steam in this manner is continued until "breakthrough." As used herein, breakthrough is defined as that point in time at which the first flavor concentrate band has reached the bottom of the column.

Prior to breakthrough a colorless frost is collected in the first trap. The colorless frost is comprised largely of water-soluble alkaline and neutral aromatic materials as well as aromatic phenolic and/or acidic materials. This first colorless frost can be either discarded or, if desired, subjected to the process of my U.S. Patent 3,579,340, issued on May 18, 1971, and entitled "Isolating Acidic Materials From a Thin Film Evaporate." Once subjected to the process of my previous patent, the colorless frost is separated into acid flavor-laden fractions which can be added back to conventional spray-dried instant coffees to enhance their aroma and flavor.

Once breakthrough has occurred a liquid flavor concentrate will be collected in the first trap. This liquid flavor concentrate is unique and different from ordinary extract concentrates in several respects. First, the liquid flavor concentrate is highly stable; this is so because the highly unstable volatile aromatic essences have been removed therefrom. Secondly, the liquid flavor concentrate has been prepared by using very low temperatures compared to conventional extraction temperatures and therefore contains different flavor constituents. Third, the liquid flavor concentrate can be, without further treatment, diluted to give a flavorful beverage of excellent quality and flavor stability.

After breakthrough has occurred the vacuum conditions in the column can be maintained until the top portions of the charged roast and ground coffee zone are again substantially dry and pulsing of wet steam can continue in the manner previously described. Pulsing is continued until the gradually downward moving band of flavor concentrate is substantially free of color-bearing bodies. At this point the band, in speaking with reference to roast and ground coffee, becomes light tan in color and this indicates that most of the color-bearing bodies, color-bearing body precursors, and flavor materials have been removed. At this point the column is discharged and a new charge of roast and ground coffee is introduced and the process repeated.

Simultaneously with the collection of a liquid flavor concentrate in the first trap, highly volatile materials pass through that first trap without condensing and are carried to the second trap which is held at liquid nitrogen temperatures. In this second trap an aroma-bearing concentrate is condensed.

Preferably the process of this invention is carried out while the entire system is subjected to downward sparging with an inert gas. The inert gas can be nitrogen, argon, heluium, freon or others. Preferably the inert gas is a combination of nitrogen and carbon dioxide which surprisingly provides a flavor enhancing effect in the subsequently separated flavor concentrate. This spraging feature aids in continual removal in a downward fashion of flavor- and aroma-carrying bodies. Where the column is being sparged in a downward manner with an inert gas and preferably with at least some carbon dioxide, carbon dioxide will condense along with aroma concentrate in the second trap. Where the aroma condensate is to be collected in the second trap as an aroma concentrate, it is preferred that carbon dioxide sparging be employed because the carbon dioxide, along with the aroma-bearing materials, will solidify in the form of an aroma-$CO_2$ matrix in the second trap. This is highly desirable because the carbon dioxide will act as a diluent and protecting medium for the highly reactive aroma-bearing materials by separating portions of the aroma concentrate from each other. This is advantageous because it allows maintaining the aroma concentrate in a relatively stable condition which prevents internal chemical reaction between different portions of the concentrate. Once such interaction is commenced it will carry through the entire aroma concentrate in an autocatalytic fashion and rapidly develop rancidity.

The collected aroma concentrate-$CO_2$ matrix can be removed from the second trap and overlaid with coffee oil and subjected to ambient conditions. The carbon dioxide will rapidly sublime while the temperature is slowly rising, leaving a highly aromatized coffee oil which can be utilized to add back to conventionally prepared dry instant coffees. Alternatively the solid aroma-$CO_2$ matrix can be mixed with frozen coffee oil, size reduced to a fine powder, and exposed to ambient conditions to provide an aroma-enriched coffee oil.

Another unique feature of the process of this invention is that the liquid flavor concentrate flavor can be carefully controlled to produce a concentrate which is either very mild in flavor, brew-like in flavor, or harsh and stringent in flavor characteristic of very strong beverages. This is accomplished by carefully controlling the grind size of the food substrate contained in the column, as well as the temperature within the column.

In particular, it has been found that liquid flavor concentrates of very mild flavor qualities are obtained where the column is held at a temperature of from 0° C. to 60° C., and the food substrate, in this case roast and ground coffee, is ground to a very fine grind size. As utilized herein, the term "very fine grind size" is intended to mean a grind size of less than 20 mesh U.S. Standard sieve. If, on the other hand, the object is to develop a unique brew-like flavor, it has been found that the grind size of the roast and ground coffee contained in the column should be a medium grind (from 9 mesh U.S. Standard sieve to 48 mesh U.S. Standard sieve), and the temperature of the roast and ground coffee contained in the column should be controlled such that it is from 30° C. to 60° C. Still further, if the object is to produce a liquid flavor concentrate of very strong harsh or even a stringent flavor, the grind size should be very coarse (greater than 7 mesh U.S. Standard sieve) and the roast and ground coffee contained within the column should be at a temperature of from 60° C. to 95° C. If a blend of each of these flavor effects is desired, a grind gradient can be employed beginning with coarser particles at the top of the column, medium grind in the middle portion, and fine grind near the bottom providing the process is conducted in a downward fashion. Additionally, grind gradients help eliminate channeling problems.

A still further unique feature of the liquid flavor concentrate produced by the process of this invention is that the yield of beverage produced from the liquid flavor concentrate is equal to and in most cases excels the yield from either roast and ground coffee brewing or conventional instant coffee preparation. 100 grams of brewing roast and ground coffee typically give 15 cups (1 cup equalling 150 ml.) of satisfactory beverage; instant coffee produced from 100 grams of roast and ground coffee traditionally gives 20 cups of beverage. The process of this invention will provide a liquid flavor concentrate which can be diluted to provide at least 20 cups per 100 grams, and more normally, from 25 to 30 cups, and in some instances, as many as 35 cups per 100 grams. Of course, in addition to the beverage yield the process also provides an aroma concentrate.

It is essential to the process of this invention that the vacuum pressure at the interface of the wet steaming zone and the dry roast and ground coffee be from .1 mm. to 200 mm. of mercury, and most preferably, from .1 mm. to 30 mm. of mercury. Where pressures greater than 200 mm. of mercury absolute are employed, insufficient cold wet steam exists to provide a liquid flavor concentrate of satisfactory qualities. The minimum pressure is given herein as a practical lower limit only.

Of course, the amount of dilution of the liquid flavor concentrate required to make a satisfactory beverage will be dependent upon the precise conditions employed in running the process as well as how long the process was run. That portion of the flavor concentrate band collected in the first trap immediately after breakthrough is most concentrated, and that portion collected after continually running the process for a period of time is least concentrated.

In further regard to the process of this invention, it should be mentioned that while the specific description given herein is of batch processing, semicontinuous and continuous processing can also be employed. Further, while a specific description has been given of the preferred downward pulsing method of wet steam desorption, it is possible to employ upward pulsing desorption, downward slow continuous desorption, upward slow continuous desorption as well as horizontal and slanted flow desorption processes. Of course, where upward desorption is employed, the vacuum must be pulled in a generally upward direction. Additionally it is preferable to employ a screen or other retaining device at the top of the column to allow easier collection of the flavor concentrate.

As heretofore mentioned, where continuous as opposed to pulsed wet steam introduction occurs, it is essential that the introduction be slow continuous introduction. For reasons mentioned heretofore with regard to the pulsing method, flooding of the column prior to breakthrough is undesirable, and if rapid continuous steam introduction is employed flooding will occur. As a general guideline, where slow continuous introduction of wet steam is employed, the amount of added steam over the entire time period prior to breakthrough should be no greater than in the pulsing method.

The substrate-containing zone, in most instances a column, can be of any suitable geometric shape but preferably is cylindrical, and for best results is not longer than 7 feet, and most preferably is from 2 to 4 feet in length. Where columns longer than four feet are employed it may be necessary to use a pressure to overcome column back pressure and to push the interface between the wet steam and the dry beans down the column.

Many variations will be readily apparent as to the manner of employing the liquid flavor concentrate. If desired, it can be packaged in a suitable dispenser and sold as a liquid concentrate, it can be carefully freeze dried, it can be freeze concentrated and thereafter freeze dried or spray dried, it can be used as a beverage flavor concentrate, as an additive to candies and chocolate flavors, and as an additive to chocolate beverages, for preparation of cold or iced coffee beverages both carbonated and non-carbonated as well as hot and cold beverages. In further regard to dispenser use, one suitable use which employs both the flavor concentrate and the aroma concentrate is to employ a dual dispenser which simultaneously dispenses flavor concentrate and aroma concentrate around the flavor concentrate stream. This provides an aromatized beverage and a room aroma of fresh ground coffee.

The following examples are offered to illustrate the process of this invention as the invention is applied to various food substrates, in particular coffee, tea, strawberries, oranges, and peanuts.

Example 1

A coffee column having of width of 5 inches and a length of 6 inches was placed in communication with two in-line condensing traps. The first trap was held at —76° C. by Dry Ice. The second trap was held at —195.8° C. by liquid nitrogen. A vacuum pump was connected to the system to allow the employment of vacuum pressures during operation.

900 grams of roasted coffee beans were frozen in liquid nitrogen and ground to a fine grind size, i.e. less than 20 mesh U.S. Standard Sieve. In order to purge the system of oxygen ten grams of solid carbon dioxide was placed on the beans and allowed to evaporate and be carried through the system to displace oxygen. The roast and ground coffee was placed in the column and wet steam was pulsed downward through the column zone under the following conditions.

TABLE I

| Time: | Temp., ° C. | Vacuum, mm. | Water addition, ml. |
|---|---|---|---|
| (Start) 11:00 | | 3 | |
| 11:05 | 50 | 0.6 | 400 |
| 11:10 | 42 | 0.5 | 100 |
| 11:15 | 60 | 0.5 | 400 |
| 11:25 | 50 | 0.5 | 400 |
| 11:40 | 45 | 0.5 | 200 |
| 11:55 | 45 | 0.5 | 300 |
| (Stop) 12:00 | 47 | 0.5 | 200 |

The cold wet steam was passed in a downward manner through the column in a pulsing fashion as indicated by the above table. The column was held at the above indicated temperatures by a water jacket. At 11:10 a dark nearly black band of materials was evident in the uppermost portions of the column. During the run this band continually moved downward through the column and breakthrough occurred at 11:10. Between 11:00 and 11:10 a colorless frost was collected in the first trap and was removed. Thereafter a liquid flavor concentrate was collected in the first trap and by the time the run was stopped a total of 775 ml. of this dark nearly black colored liquid flavor concentrate was collected. The concentrate had a very pleasant coffee odor and when 15 ml. of this liquid flavor concentrate was mixed with hot tap water (150 ml.) a pleasant coffee flavor and odor-containing beverage was produced. The flavor was noted as characteristic of that of mild high grown coffees. The liquid flavor concentrate was allowed to stand under ambient conditons for 5 days and was again tested after an additional ten days in the manner just described, and likewise was still found to have a pleasant flavor and aroma and produced an excelent mild and somewhat brew-like beverage upon dilution.

Simultaneously with the collection of a liquid concentrate in the manner above mentioned, the second trap which was held at liquid nitrogen temperatures provided a solidified aroma frost which comprise coffee aroma and carbon dioxide solidified into an aroma-$CO_2$ matrix. This aroma-$CO_2$ matrix was placed in 40 ml. of expressed and purified coffee oil and allowed to equilibrate until all of the $CO_2$ had sublimed. The coffee oil was noted to contain an excellent coffee-like aroma and when placed upon conventionally spray-dried instant coffee at a 0.2% by weight level significantly enhanced the aroma of the product.

Equivalent results to those shown in this example are obtained when the example is duplicated using a slow continuous wet steam addition as opposed to pulsing. The same amount of steam was employed in the continuous process as employed in the pulsing addition shown herein.

Example 2

The apparatus previously described in Example 1 was employed. The total amount of roast and ground coffee ground to a grind size of from 20 mesh U.S. Standard Sieve to 48 mesh U.S. Standard Sieve was 1200 grams. The entire system was purged of oxygen by placing a small amount of Dry Ice within the system prior to commencement of the process. The process was operated utilizing the conditions given in the following table:

TABLE II

| Time: | Temp., °C. | Vacuum, mm. | Water addition, ml. |
|---|---|---|---|
| 1:40 | 55 | 0.5 | 600 |
| 1:45 | 55 | 0.5 | |
| 1:50 | 55 | 0.5 | 400 |
| 1:55 | 55 | 0.5 | 500 |
| 2:10 | 55 | 0.5 | 700 |
| 2:15 | 55 | 0.5 | 800 |
| 2:25 | 55 | 0.5 | 500 |

Between 1:40 and 1:45 a colorless frost appeared in the first trap and was removed. Thereafter, while downward steam pulsing continued as shown in the table, a dark black band was noted to be present in the column and gradually moving downward at the interface of the wet steam and dry beans. Breakthrough occurred at 11:45. The total amount of liquid flavor concentrate collected in the first trap was 1900 ml. The trap was kept at −76° C. by a Dry Ice acetone bath. The second trap was cooled to liquid nitrogen temperatures and simultaneously with the collection of the liquid flavor concentrates an aroma and carbon dioxide matirx solidified in this second trap.

The highly volatile aroma portion collected in the second trap was added to the liquid flavor concentrate collected in the first trap and while the initial aroma impact was significantly increased, it was noted that within 10 minutes the flavor as well as aroma of the flavor concentrate rapidly developed a stale rancid note. The flavor changes were noted to continue with increasing time. It was therefore concluded that the addition of the highly volatile aroma materials from the solidified aroma-$CO_2$ matrix to the liquid flavor concentrate was undesirable because the highly volatile compounds rapidly decomposed thereafter acted as catalytic agents to rapidly degrade the pleasant odor and flavor of the liquid flavor concentrate.

Example 3

Utilizing the apparatus shown in Example 1, two pounds of frozen strawberries were subjected to the process of this invention. Prior to commencement of the process 20 grams of powdered carbon dioxide was added to the system to purge the system of oxygen. The process was conducted utilizing the following conditions:

TABLE III

| Time: | Temp., °C. | Vacuum, mm. | Water addition, ml. |
|---|---|---|---|
| 2:00 | 0 | 0.2 | |
| 2:10 | 22 | 0.2 | 100 |
| 2:14 | 40 | 0.2 | 300 |
| 2:35 | 23 | 0.2 | 300 |
| 2:50 | 25 | 0.2 | 100 |
| 3:00 | 25 | 0.2 | 200 |
| 3:10 | 35 | 0.2 | 200 |

Prior to commencement of the process the frozen strawberries were ground to a grind size of 7.

In this instance, while pulsing of the steam occurred in a downward manner, as previously shown, the color band which gradually moved downward through the column at the interface of the wet steam and the "dry" strawberries, was noted to be a deep crimson red in color. Breakthrough occurred at 2:10. The aroma-$CO_2$ matrix collected in the liquid nitrogen trap was noted to contain a very pleasant but not particularly intense strawberry aroma. The liquid concentrate which was collected in the first trap which was held at −76° C. by a dry ice acetone bath, was noted to have a very intense strawberry flavor and a mild strawberry aroma. The color of the band continually decreased after breakthrough, and by 3:10 when the process was stopped, the band was only a very pale pink in color.

The liquid flavor concentrate upon storage was noted to be stable and did not develop any rancid odors. In addition, the liquid concentrate when diluted using 20 ml. of concentrate and 80 ml. of water, was noted to provide a very pleasant strawberry flavored beverage.

Example 4

Utilizing the apparatus shown in Example 1, peeled frozen oranges which had been frozen in liquid nitrogen and finely ground to a mesh size of 7 were placed in the column. 25 grams of carbon dioxide were placed in the system and allowed to sublime to purge the system of oxygen. During operation of the process of this invention, the system was continually flushed in a downward manner with carbon dioxide. The process was run utilizing the following conditions:

TABLE IV

| Time: | Temp., °C. | Vacuum, mm. | Water addition, ml. |
|---|---|---|---|
| 1:20 | 25 | 0.3 | |
| 1:30 | 13 | 0.3 | 300 |
| 2:00 | 18 | 0.3 | 100 |
| 2:30 | 19 | 0.3 | 100 |
| 3:00 | 30 | 0.3 | 100 |

400 ml. of liquid flavor concentrate was collected in the first trap. Breakthrough occurred at 1:30. The band which continually moved downward through the column as pulsing of the wet steam occurred was noted to be a bright, very intense orange in color. At 3:00 when the process was stopped the substrate remaining in the column was noted to have only a very slight orangish color. The liquid flavor concentrate was very pleasant in orange aroma and when diluted to 150 ml. by the addition of 75 ml. of water to 75 ml. of the liquid flavor concentrate, gave an excellent orange flavor beverage which did not develop any notable staleness or rancidity after 5 hours of continual subjection to ambient conditions.

The liquid nitrogen trap contained a very pleasant but not especially intense orange aroma-$CO_2$ matrix.

Example 5

310 grams of unsalted peanuts were frozen in liquid nitrogen and crushed quickly to an estimated particle size of 20 mesh U.S. Standard Sieve screen. The peanuts were transferred to the column of the apparatus disclosed in Example 1. The process of the invention was then run utilizing the following conditions:

TABLE V

| Time: | Temp., °C. | Vacuum, mm. | Water addition, ml. |
|---|---|---|---|
| 10:05 | 22 | 0.8 | |
| 10:10 | 40 | 0.4 | 200 |
| 10:15 | 30 | 0.4 | 300 |
| 10:30 | 30 | 0.4 | 200 |

As in the case of Examples 1–4, the column was maintained at temperatures within the above described range by a cold water jacket which surrounded the column.

475 ml. of liquid flavor concentrate was collected in the first trap. The band which continually moved down through the column as pulsing of cold wet steam in a downward fashion occurred was dark tan in color and breakthrough occurred at 10:10. The collected liquid flavor concentrate was noted to have a very pleasant peanut odor and was found to be suitable for flavor and aroma enhancement of dry peanuts by spraying small amounts thereon. The aroma matrix collected in the second trap which was held at liquid nitrogen temperatures was found to be very strong in peanut aroma.

The peanut liquid flavor concentrate was found to be desirable to add to food products where peanut flavor was desired. For example, in cake mixes, brownie mixes, and the like. The aroma-$CO_2$ matrix when transferred to peanut oil and placed upon dry salted peanuts was found to provide an enhanced peanut aroma.

Example 6

An apparatus similar to that used in Example 1 was employed. However, in this example since upward steam pulsation was employed, the in-line condenser traps were in communication with the top portion of the column, and the column was continually sparged from the bottom upward with nitrogen gas. The vacuum was drawn from the top of the column. Near the top portion of the column a perforated Plexiglas plate fitting the diameter of the column was placed on top of the bed of food substrate.

Two thousand grams of roasted coffee beans were frozen in liquid nitrogen and ground to a fine grind size of less than 20 mesh U.S. Standard sieve screen. The roast and ground coffee was placed in the column and wet pulsed upward through the column zone under the following conditions:

TABLE VI

| | Temp., °C. | Vacuum, mm. | Water addition, ml. |
|---|---|---|---|
| Time: | | | |
| (Start) 10:55 | 60 | 0.2 | |
| 12:00 | 75 | 0.3 | 3,250 |
| 1:00 | 75 | 0.3 | 4,800 |
| 1:05 | 78 | 0.3 | 5,400 |
| (Stop) 2:30 | 78 | 0.3 | 9,000 |

The cold wet steam was passed in an upward manner through the column in a pulsing fashion as indicated by the above table. The column was held at the above indicated temperatures by a water jacket. While upward steam pulsing continued as shown in the table, a dark black band was noted to be present in the column and gradually moving upward at the interface of the wet steam and the dry beans. Breakthrough occurred at 1:05. The total amount of liquid flavor concentrate collected in a first trap was 1650 ml. The trap was held at −76° C. by a Dry Ice acetone bath. The second trap was cooled to liquid nitrogen temperatures and simultaneously with the collection of the liquid flavor concentrate an aroma concentrate solidified in the second trap.

Thereafter the liquid flavor concentrate was utilized to make samples of coffee beverage substantially indistinguishable from fresh brewed coffee. The procedure employed in making the beverage was identical to that shown in Example 1.

Example 7

The procedure shown in Example 1 was repeated utilizing 906 grams of orange and black pekoe tea blend as the food substrate. The tea was placed in the column and wet steam was pulsed downward through the column under the following conditions:

TABLE VII

| | Temp., °C. | Vacuum, mm. | Water addition, ml. |
|---|---|---|---|
| Time: | | | |
| (Start) 10:37 | 63 | 0.1 | |
| 10:43 | 59 | 0.1 | |
| 11:05 | 60 | 0.1 | 800 |
| 11:35 | 60 | 0.1 | 1,800 |
| 12:07 | 60 | 0.1 | 2,800 |
| 1:05 | 60 | 0.1 | 3,600 |
| 2:10 | 60 | 0.1 | 5,400 |
| 2:35 | 60 | 0.1 | 7,200 |
| (Stop) 3:00 | | | |

At 10:40 time a dark colored band of materials was evident in the uppermost portion of the column. The band continually moved downward through the column at the interface of dry tea and the wet steam. Breakthrough occurred at 11:35. Between 10:40 and 11:35 a colorless frost was collected in the first trap and was removed. A total of 4955 ml. of liquid flavor concentrate was collected in the first trap. The flavor concentrate had a very pleasant tea odor, and when diluted provided tea beverage of excellent quality. The total amount of percentage solids obtained from the 906 grams of tea leaves was 30.4% by weight of the starting material, calculated upon the basis of weight of freeze dried product obtained from freeze drying the flavor concentrate.

What is claimed is:

1. A method of separating an aroma- and flavor-bearing substrate into an aroma concentrate and a flavor concentrate fraction, said method comprising: pulsing wet steam through a zone containing said substrate in a manner which avoids flooding said zone with wet steam, while said zone is held at an absolute pressure of from .1 mm. to 200 mm. of mercury; collecting said flavor concentrate in a first trap which is in communication with said substrate containing zone and which is held at a temperature of from −20° C. to −76° C.; and collecting said aroma condensate in a second trap which is in communication with said first trap and which is held at liquid nitrogen temperatures.

2. The process of claim 1 wherein said steam is pulsed in downward fashion through the substrate containing zone.

3. The process of claim 2 wherein said substrate-containing zone is held at temperatures of from 0° C. to 60° C.

4. The process of claim 3 wherein the substrate is finely ground.

5. The process of claim 2 wherein said substrate is held at from 30° C. to 60° C.

6. The process of claim 5 wherein the substrate is ground to a medium grind size range.

7. The process of claim 2 wherein said substrate is held at from 60° to 95° C.

8. The process of claim 7 wherein the substrate is ground to a coarse grind size range.

9. The process of claim 2 wherein the absolute vacuum pressure is from .1 mm. to 30 mm. of mercury.

10. The process of claim 2 wherein the substrate is roast and ground coffee.

11. The process of claim 2 wherein the substrate is tea.

12. The process of claim 2 wherein the substrate is a fruit.

13. The process of claim 2 wherein the substrate is a vegetable.

14. The process of claim 2 wherein the substrate-containing zone, the first trap, and the second trap are all flushed with an inert gas as a first step in order to displace oxygen from the system.

15. The process of claim 14 wherein the inert gas is $CO_2$.

16. The process of claim 2 wherein the entire system comprising the substrate-containing zone and the first and second traps is subjected to an inert gas sparge.

17. The process of claim 16 wherein the inert gas is a mixture of nitrogen and carbon dioxide.

18. The process of claim 2 wherein pulsing continues until the flavoring concentrate coming from said substrate containing zone is substantially free of color-bearing bodies.

19. The process of claim 2 wherein the substrate-containing zone is from about 2 to 4 feet in length.

20. The process of claim 2 wherein the substrate-containing zone is a maximum of 7 feet long.

21. The process of claim 2 wherein the substrate-containing zone contains a grind gradient beginning with coarser particles at the top and ending with the finest particles at the bottom.

22. The liquid flavor concentrate produced by the process of claim 1.

23. The process of claim 1 wherein the food substrate is frozen in liquid nitrogen prior to size reduction and charging into the foods substrate zone.

24. A method of separating an aroma- and flavor-bearing substrate into an aroma concentrate and a flavor concentrate fraction, said method comprising: slowly and continuously passing wet steam through a zone containing said substrate in a manner which avoids flooding said zone with wet steam, while said zone is held at an absolute pressure of from 0.1 mm. to 200 mm. of mercury; collecting said flavor concentrate in a first trap which is in communication with said substrate-containing zone and which is held at a temperature of from $-20°$ C. to $-76°$ C.; and collecting said aroma concentrate in a second trap which is in communication with said first trap and which is held at liquid nitrogen temperatures.

25. The process of claim 24 wherein said slow continuous steam introduction occurs in a downward manner.

26. The process of claim 24 wherein said slow continuous steam introduction occurs in an upward manner.

References Cited
UNITED STATES PATENTS

| | | | |
|---|---|---|---|
| 2,680,687 | 6/1954 | Lemonnier | 99—71 |
| 3,035,922 | 5/1962 | Mook et al. | 99—71 |
| 3,244,531 | 4/1966 | Clinton et al. | 99—71 |
| 3,406,374 | 10/1968 | Klein et al. | 99—71 |
| 3,653,910 | 4/1972 | Pitchon | 99—71 |

FRANK W. LUTTER, Primary Examiner

W. L. MENTLIK, Assistant Examiner

U.S. Cl. X.R.

99—71, 72, 76, 100 R, 140 R